Nov. 8, 1949    H. E. CORBITT    2,487,043
ROTARY DEVICE FOR JUICING ORANGES
Filed Aug. 19, 1946

INVENTOR.
HOWARD E. CORBITT
BY
ATTORNEYS

Patented Nov. 8, 1949

2,487,043

UNITED STATES PATENT OFFICE 2,487,043

ROTARY DEVICE FOR JUICING ORANGES

Howard E. Corbitt, Alhambra, Calif., assignor to Howard Corbitt, Incorporated, Montrose, Calif., a corporation of California Application August 19, 1946, Serial No. 691,597

1 Claim. (Cl. 146—3)

This invention is concerned with juicers, particularly fruit juicers provided with a reamer for removing the juice from oranges, lemons and other fruits having a relatively heavy rind or skin. The invention provides a novel fruit juicer that is simple, rugged and easy to operate.

A common type of fruit juicer comprises a dish having a centrally and rigidly mounted reamer. Fruit to be treated, say half an orange or half a lemon, is pressed down over the reamer member which is roughly conical in shape and fluted from top to bottom. By pressing down the fruit and at the same time turning it on the reamer, the juice and pulp are removed from the skin. This operation, although satisfactory in many respects, is time consuming and does not assure maximum recovery. There is a distinct need for a simple form of reamer type juicer which will accomplish the job more expeditiously.

As a result of my investigations, I have developed a juicer which accomplishes its purpose more conveniently and thoroughly than heretofore customary types. In essence, it comprises a dish, a crank mounted centrally thereon, and having an arm extending over the dish and a fruit reamer rigidly mounted in an upright position on the end of the crank and adapted to swing within the periphery of the dish. Fruit to be juiced, for example half an orange, is pressed down over the reamer while at the same time the reamer is rotated around the dish. Since the reamer is rigidly mounted on the crank, there is relative rotation between the reamer itself and the fruit which is held and not permitted to turn with the reamer. The resulting action is a reaming one which speedily removes the contents of the fruit.

In my preferred structure, I provide a screen disposed between the crank arm and the dish. If desired, the crank arm may be mounted on the screen.

The screen should be detachable, and in its preferred form is provided with radial strengthening ribs which support a journal for the crank shaft at the center of the screen.

Crank and reamer, whether mounted on the dish directly or upon the screen, may be detachable to facilitate cleaning, et cetera, or the reamer only may be detachable.

If desired, the crank can be mounted on a journal formed integrally with the dish approximately at its center. In such case, the crank simply rests in the journal and may be removed by pulling it upward.

These and other aspects of my invention will be understood more thoroughly in the light of the following detailed description taken in conjunction with the accompanying drawings in which Fig. 1 is a plan view of one form of juicer of my invention, provided with a screen upon which crank and reamer are mounted;

Figure 1:
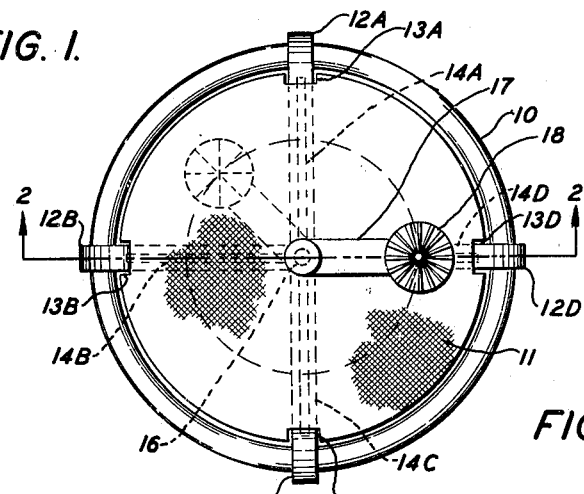

The juicer of Fig. 1 comprises a dish 10, having a flat bottom and relatively vertical sides. A screen 11 covers the dish and so is disposed between the dish and the juice extracting means mounted above it. The screen is supported on a set of hooks 12A, 12B, 12C, 12D around its periphery. There are corresponding slots 13A, 13B, 13C and 13D in the screen, and these slots fit over the hooks, which are disposed respectively on the ends of reinforcing ribs 14A, 14B, 14C, 14D extending radially from the center of the screen. These reinforcing ribs support the screen and also support a journal 15 which has an upright bore in which the shaft 16 of a crank 17 is disposed. The crank rotates around the center of the screen and its arm carries a reamer 18 on its outer end. The circle of rotation of the reamer is within the periphery of the dish so that juice extracted from fruit falls into the dish through the screen.

The reamer may be constructed in various forms. I prefer a roughly conical member having flutings running upward from its outer edge to its center. It may be perforated.

Figure 2:
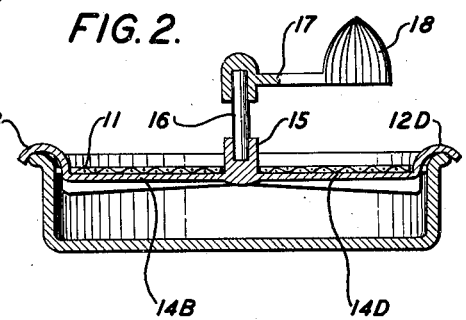
Fig. 2 is a cross section taken through the device of Fig. 1 along the line 2—2.

In the operation of the apparatus of Fig. 1 and 2, the fruit, say an orange, is cut into convenient pieces, say halves, and each half is then pressed down over the reamer and held so that it will not turn while fruit and reamer are rotated in the crank circle. The reamer is thus forced to rotate within the fruit and accomplishes the juicing operation very rapidly. Pulp and seeds extracted in the juicing operation are retained on the screen.

It is a simple matter to remove crank, reamer and screen and wash them off under a tap, leaving the screened juice in the dish.

Figure 3:
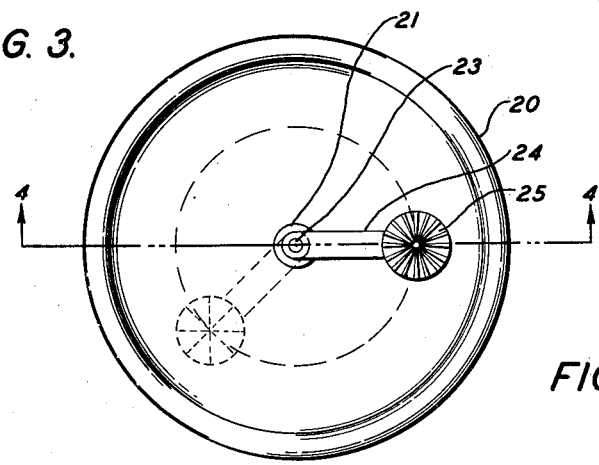
Fig. 3 is a plan view of another form of the device of my invention in which crank and reamer are mounted in a journal formed integrally with the bottom of the dish.
Figure 4:
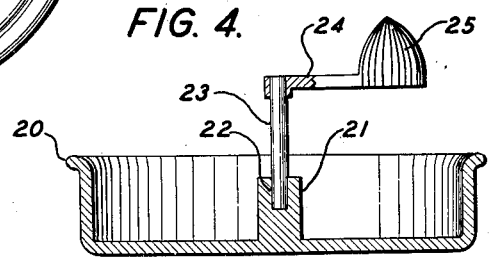
Fig. 4 is a cross section of the device of Fig. 3 taken along the line 4—4.

A somewhat more simple and perhaps less convenient type of the apparatus of the invention is illustrated by Figs. 3 and 4. Referring to these figures, it will be observed that the apparatus comprises a dish 20, having an integrally formed central journal or bearing 21, with an upwardly extending bore 22 within which a shaft 23 of a crank 24 is disposed. As in the previous case, the crank 24 carries an upright, rigidly mounted reamer 25 which is adapted to rotate in a circle within the periphery of the dish.

The operation of the apparatus of Figs. 3 and 4 is substantially the same as that of Figs. 1 and 2. A cut half of fruit or the like is pressed down over the reamer with the hand which at the same time moves in a circle to rotate the reamer around the shaft. Pulp, juice and seeds are thus squeezed out of the fruit and dropped directly into the dish.

If desired, the apparatus of Figs. 3 and 4 can be provided with a screen hung over the edges of the dish and provided with a central orifice through which the shaft of the crank projects.

The juicer of my invention is many times more rapid in its action than is the conventional reamer type juicer. Moreover, it accomplishes a more thorough extraction of juice. It is easy to operate and, especially when in the form illustrated by Figs. 1 and 2, assures convenient straining of juice and cleaning of apparatus.

I claim:

A fruit juicer comprising a dish having substantially vertical sides, a plurality of ribs projecting diametrically across the dish and having hooks at their opposite ends extending over the upper edge of the dish, a journal supported above the center of the dish by the ribs and having a vertical bore, a crank rotatably and removably mounted in the journal and having an arm extending radially over the dish, a fruit reamer rigidly mounted in an upright position to the outer end of the arm and adapted to swing within the periphery of the dish, and a screen supported on the ribs and slotted to fit over the hooks.

HOWARD E. CORBITT.

REFERENCES CITED

The following references are of record in the file of this patent:

UNITED STATES PATENTS

| Number | Name | Date |
|---|---|---|
| 1,747,641 | Morris | Feb. 18, 1930 |
| 1,751,627 | Glenny | Mar. 25, 1930 |
| 2,088,815 | Scott | Aug. 3, 1937 |
| 2,291,028 | Cummins | July 28, 1942 |